United States Patent
Tsukada

(10) Patent No.: US 8,122,210 B2
(45) Date of Patent: Feb. 21, 2012

(54) DATA BACKUP DEVICE, DATA BACKUP SYSTEM, AND DATA BACKUP PROGRAM

(75) Inventor: Koji Tsukada, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 270 days.

(21) Appl. No.: 11/589,258

(22) Filed: Oct. 30, 2006

(65) Prior Publication Data

US 2007/0150678 A1    Jun. 28, 2007

(30) Foreign Application Priority Data

Dec. 28, 2005   (JP) ................................ 2005-380475

(51) Int. Cl.
*G06F 12/16* (2006.01)

(52) U.S. Cl. . 711/162; 711/154; 711/161; 711/E12.103; 714/E11.119; 714/E11.125; 707/650

(58) Field of Classification Search .................. 711/162; 714/E11.119, E11.125
See application file for complete search history.

(56) References Cited

U.S. PATENT DOCUMENTS

| | | | | |
|---|---|---|---|---|
| 4,506,323 A * | 3/1985 | Pusic et al. | ..................... | 711/161 |
| 5,131,077 A * | 7/1992 | Indei | ............................ | 358/1.14 |
| 5,943,503 A * | 8/1999 | Kai | ............................... | 708/833 |
| 7,437,388 B1 * | 10/2008 | DeVos | .......................... | 707/204 |
| 2004/0243991 A1 * | 12/2004 | Gustafson et al. | ............ | 717/168 |
| 2005/0055523 A1 * | 3/2005 | Suishu et al. | .................. | 711/162 |
| 2006/0206544 A1 * | 9/2006 | Oks et al. | ...................... | 707/204 |
| 2007/0002484 A1 * | 1/2007 | Okamoto | ......................... | 360/69 |
| 2008/0276122 A1 * | 11/2008 | Vangeel | ......................... | 711/162 |

FOREIGN PATENT DOCUMENTS

| | | |
|---|---|---|
| JP | 8-244317 | 9/1996 |
| JP | 08244317 A * | 9/1996 |
| JP | 2000-047535 | 2/2000 |
| JP | 2000-330752 | 11/2000 |
| JP | 2001067256 A * | 3/2001 |
| JP | 2002-244904 | 8/2002 |
| JP | 2004-230617 | 8/2004 |
| JP | 2005-149025 | 6/2005 |
| JP | 2005-301857 | 10/2005 |

OTHER PUBLICATIONS

A Notification of Reasons for Refusal issued in corresponding Japanese Patent Application No. 2005-380475, mailed May 19, 2009, and English translation thereof.

* cited by examiner

*Primary Examiner* — Michael Krofcheck
(74) *Attorney, Agent, or Firm* — Buchanan Ingersoll & Rooney PC

(57) ABSTRACT

The data backup device comprising a receiver unit receiving from an image forming apparatus via a network, backup data and sender information indicating the location of the image forming apparatus on the network; a memory unit storing the backup data and the sender information that are received; an operating state acquiring unit acquiring based on the sender information, the operating state of the image forming apparatus whether or not it is ready to receive the backup data; a judgment unit judging based on the acquired operating state, whether or not the image forming apparatus is ready to receive the backup data; and a transmitting unit sending back the backup data to the image forming apparatus based on the sender information when the judgment unit judges that the image forming apparatus is ready to receive the backup data.

16 Claims, 12 Drawing Sheets

| Reference number | Sender address | Device code | Serial number | Old ID number | ID number |
|---|---|---|---|---|---|
| 01 | 11.22.33.44 | 1234 | 010123 | 00001 | 00005 |
| 02 | 11.22.33.45 | 1236 | 070124 | 00002 | 00006 |
| • • | • • | • • | • • | • • | • • |

| Box number | Box name |
|---|---|
| 01 | ABCD |
| 02 | BCDE |
| .. | .. |

108b

| Reference number | Image data name | Data | Time | Data size | ID number | Box number |
|---|---|---|---|---|---|---|
| 01 | 0503230001 | 2005/03/22 | 12:00 | 627,000byte | 00001 | 01 |
| 02 | ABCD | 2005/03/23 | 18:12 | 24,064byte | 00002 | 01 |
| .. | .. | .. | .. | .. | .. | .. |

| Reference number | Sender address | Device code | Serial number | Old ID number | ID number |
|---|---|---|---|---|---|
| 01 | 11.22.33.44 | 1234 | 010123 | 00001 | 00005 |
| 02 | 11.22.33.45 | 1236 | 070124 | 00002 | 00006 |
| ⋮ | ⋮ | ⋮ | ⋮ | ⋮ | ⋮ |

111

| Reference number | Destination | Mail address |
|---|---|---|
| 001 | ABCD | abc@abc.co.jp |
| 002 | BCDE | bcd@abc.co.jp |
| ⋮ | ⋮ | ⋮ |

| Reference number | Destination | Network address |
|---|---|---|
| 001 | ABCD | 100.100.100.100 |
| 002 | BCDE | ¥¥abc¥ab |
| ⋮ | ⋮ | ⋮ |

| Reference number | Destination | Digits |
|---|---|---|
| 001 | ABCD | 0123-45-6789 |
| 002 | BCDE | 000-111-2222 |
| ⋮ | ⋮ | ⋮ |

FIG.10

DATA BACKUP DEVICE, DATA BACKUP SYSTEM, AND DATA BACKUP PROGRAM

The application claims priority under 35 U.S.C. §119 to Japanese Patent Application No. 2005-380475 filed on Dec. 28, 2005, and the disclosure of which is incorporated herein by reference in its entirety.

BACKGROUND OF THE INVENTION

1. Field of the Invention

The present invention relates to a data backup device and a data backup system enabling backup of data such as user's registered information in an image forming apparatus via a network, and a data backup program stored on a computer readable medium to make a computer execute data backup and subsequent processes.

2. Description of the Related Art

The following description sets forth the inventor's knowledge of related art and problems therein and should not be construed as an admission of knowledge in the prior art.

As an example of the traditional and general uses of an image forming apparatus such as a multifunctional machine having copying, printing, facsimile and other functions, multiple personal computers were connected to one image forming apparatus and print data transmitted from a personal computer is printed in the image forming apparatus. However, connection via a network between multiple image forming apparatuses, or an image forming apparatus and other devices including personal computers, becomes more popular recently along with the increase in the number of such apparatuses and devices. Thus, free communication of data, image data for example, among different image forming apparatuses, or an image forming apparatus and personal computers, is proposed.

Japanese Unexamined Patent Publication No. 8-244317 discloses a method to prevent, in such a network-connected image forming apparatus, the destruction of various settings set on the image forming apparatus by electrical trouble, malfunction, operator's mistake, etc.

According to the method, when a service person intends to update the firmware of an image forming apparatus, or clear the memory storing image data, settings, etc. for system reset for example, the registered data including mail address, digits, network address and so on inputted by users are transferred and stored in another image forming apparatus connected via a network before the service just in case, so that the data can be retrieved therefrom after the service as needed.

Since the apparatus needs to be restarted after the firmware update or the memory clear, the registered data are stored together with transfer destination information in area where is able to keep the data even when the power is off. Thus, even if just a part of the registered data got removed accidentally, the transfer destination information could be removed at the same time.

The firmware consists of a program area and a registered data area, and if there is a change of program volume in the program area by block, or a change of the data format and the total number of registered data in the registered data area, limited capacity of the memory in the image forming apparatus may disable regular data conversion by the software for firmware update. In this case, the registered data and transfer destination information stored in the image forming apparatus are rewritten with the default settings of the software, and consequently missing.

In the above possible cases where the transfer destination information of the registered data is missing from the image forming apparatus, it is not possible to retrieve the registered data backuped in the data backup device.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

An object of the present invention is to provide a data backup device that enables retrieval of backup data to an originating image forming apparatus even if transfer destination information is missing from the apparatus thereof.

Another object of the present invention is to provide a data backup system that enables retrieval of backup data into an originating image forming apparatus even if transfer destination information is missing from the apparatus thereof.

Yet another object of the present invention is to provide a recording medium carrying a data backup program to make a computer execute data backup and subsequent processes.

A first aspect of the present invention is a data backup device, comprising:
  a receiver unit receiving from an image forming apparatus via a network backup data and sender information indicating the location of the image forming apparatus on the network;
  a memory unit storing the backup data and the sender information that are received; an operating state acquiring unit acquiring based on the sender information, the operating state of the image forming apparatus, whether or not it is ready to receive the backup data;
  a judgment unit judging based on the acquired operating state, whether or not the image forming apparatus is ready to receive the backup data; and
  a transmitting unit sending back based on the sender information, the backup data to the image forming apparatus if the judgment unit judges that the image forming apparatus is ready to receive the backup data.

A second aspect of the present invention is a data backup system including an image forming apparatus and a data backup device backuping the data in the image forming apparatus, and those are interconnected via a network,
the data backup device, comprising:
  a receiver unit receiving from the image forming apparatus via the network, backup data and sender information indicating the location of the image forming apparatus on the network;
  a memory unit storing the backup data and the sender information that are received;
  an operating state acquiring unit acquiring based on the sender information, the operating state of the image forming apparatus whether or not it is ready to receive the backup data;
  a judgment unit judging based on the acquired operating state, whether or not the image forming apparatus is ready to receive the backup data; and
  a transmitting unit sending back the backup data based on the sender information, to the image forming apparatus if the judgment unit judges that the image forming apparatus is ready to receive the backup data, and the image forming apparatus, comprising:
- a transmitting unit transmitting the backup data and the sender information to a data backup device;
- a receiver unit receiving the backup data transmitted from the data backup device; and
- a data restoration unit restoring data from the received backup data.

A third aspect of the present invention is a data backup program stored on a computer readable medium to make a computer executes processing comprising the steps of:
- receiving from an image forming apparatus via a network, backup data and sender information indicating the location of the image forming apparatus on the network;
- storing in a memory unit, the backup data and the sender information that are received;
- acquiring based on the sender information, the operating state of the image forming apparatus to examine whether or not the image forming apparatus is ready to receive the backup data;
- judging based on the acquired operating state, whether or not the image forming apparatus is ready to receive the backup data; and
- sending back the backup data based on the sender information, to the image forming apparatus when the image forming apparatus is judged to be ready to receive the backup data in the prior step.

The above and/or other aspects, features and/or advantages of various embodiments will be further appreciated in view of the following description in conjunction with the accompanying figures. Various embodiments can include and/or exclude different aspect, feature and/or advantages where applicable. In addition, various embodiments can combine one or more aspects or features of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 5 includes tables for image data management with its content;

FIG. 8 is a view showing a mail address table with its content;

FIG. 9 is a view showing a network address table with its content;

FIG. 10 is a view showing a digits table with its content;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

(1) Configuration of Image Forming System

Figure 1:
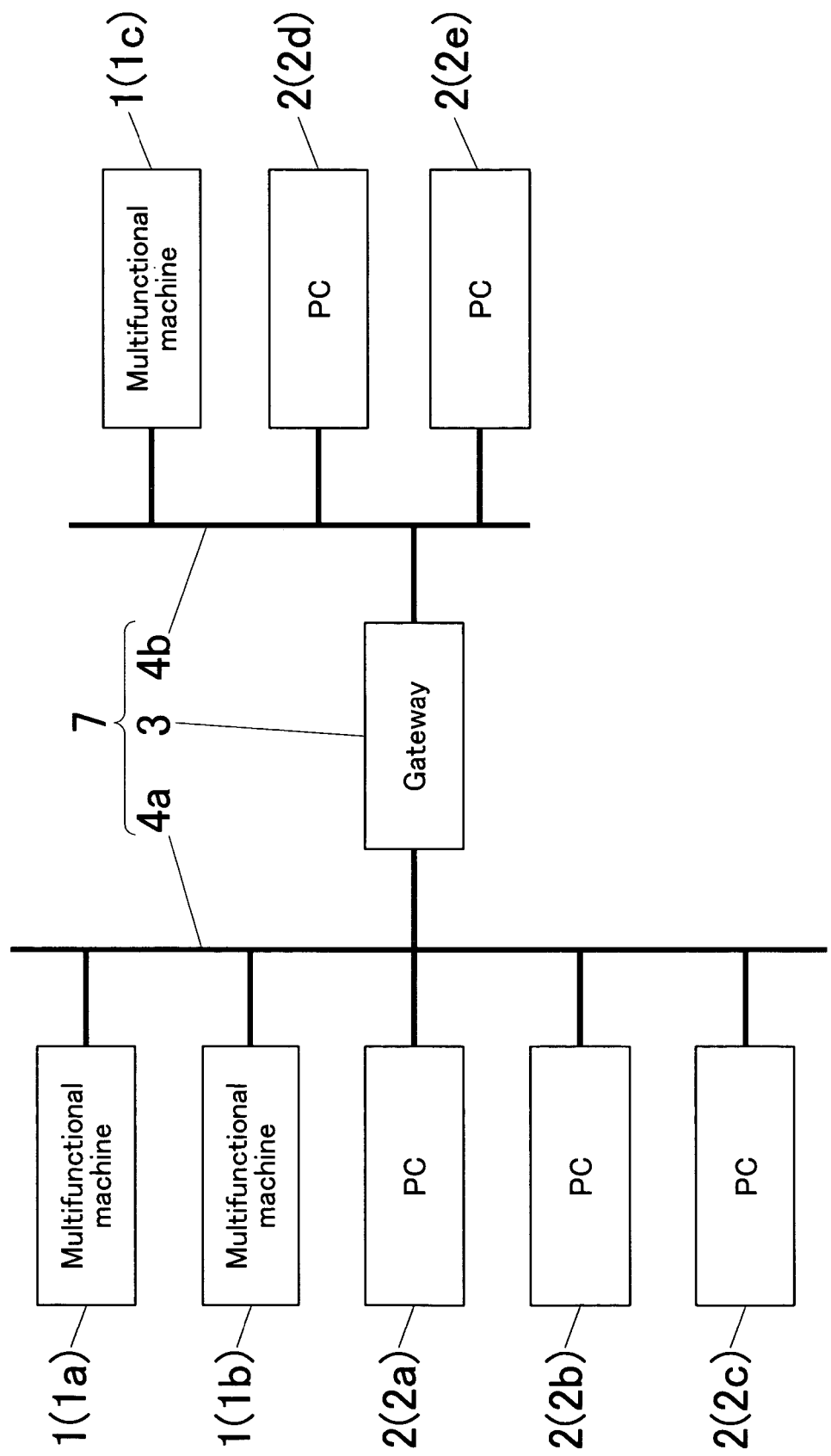
FIG. 1 is a block diagram showing the configuration of an image forming system in an embodiment of the present invention.

FIG. 1 is a chart showing the configuration of an image forming system including multifunctional machines 1 (1a to 1c), as image forming apparatuses, in an embodiment of the present invention.

As shown in FIG. 1, in the image forming system, multifunctional machines 1a and 1b and personal computers (hereinafter, referred to as PCs) 2 (2a to 2c) are connected via a subnetwork 4a; the multifunctional machine 1c and PCs 2d and 2e are connected via a subnetwork 4b; and the subnetworks 4a and 4b are interconnected via a gateway 3. Generally, the subnetworks 4a and 4b, and the gateway 3 are jointly called a network 7 or LAN 7.

The subnetworks 4a and 4b are constructed according to the TCP/IP protocol. A different IP address and the same subnet mask are allocated to each constituent machine, and data is able to be communicated directly between two machines when they are recognized with the IP address and the subnet mask, to be on the same subnetwork, while data is communicated via the gateway 3 when they are recognized to be on different subnetworks.

The multifunctional machine 1 is a so-called digital multifunctional machine, having a function to read an image on an original document placed in a given position of the apparatus and print it on a sheet (copy function), a function to store the image data, a function to receive a printing instruction from the PC2, connected to the network 7, and print image on a sheet according to the instruction (print function), a function to store the image data transmitted from the PC2 or another multifunctional machine 1, a function to print stored image data on a sheet, and a function to transfer image data to PC2 or another multifunctional machine 1.

PC2 has a main body containing a CPU, a memory, a hard disk drive (HDD), etc., a monitor unit and input units such as a keyboard, mouse, etc. Application software which enables document creation, drawing, etc. is installed in the PC2, and a user can send an instruction from the PC2 to the multifunctional machines 1 to print or store his/her created document or file. The PC2 can also receive image data from the multifunctional machines 1.

(2) Configuration of Entire Multifunctional Machine 1

Figure 2:
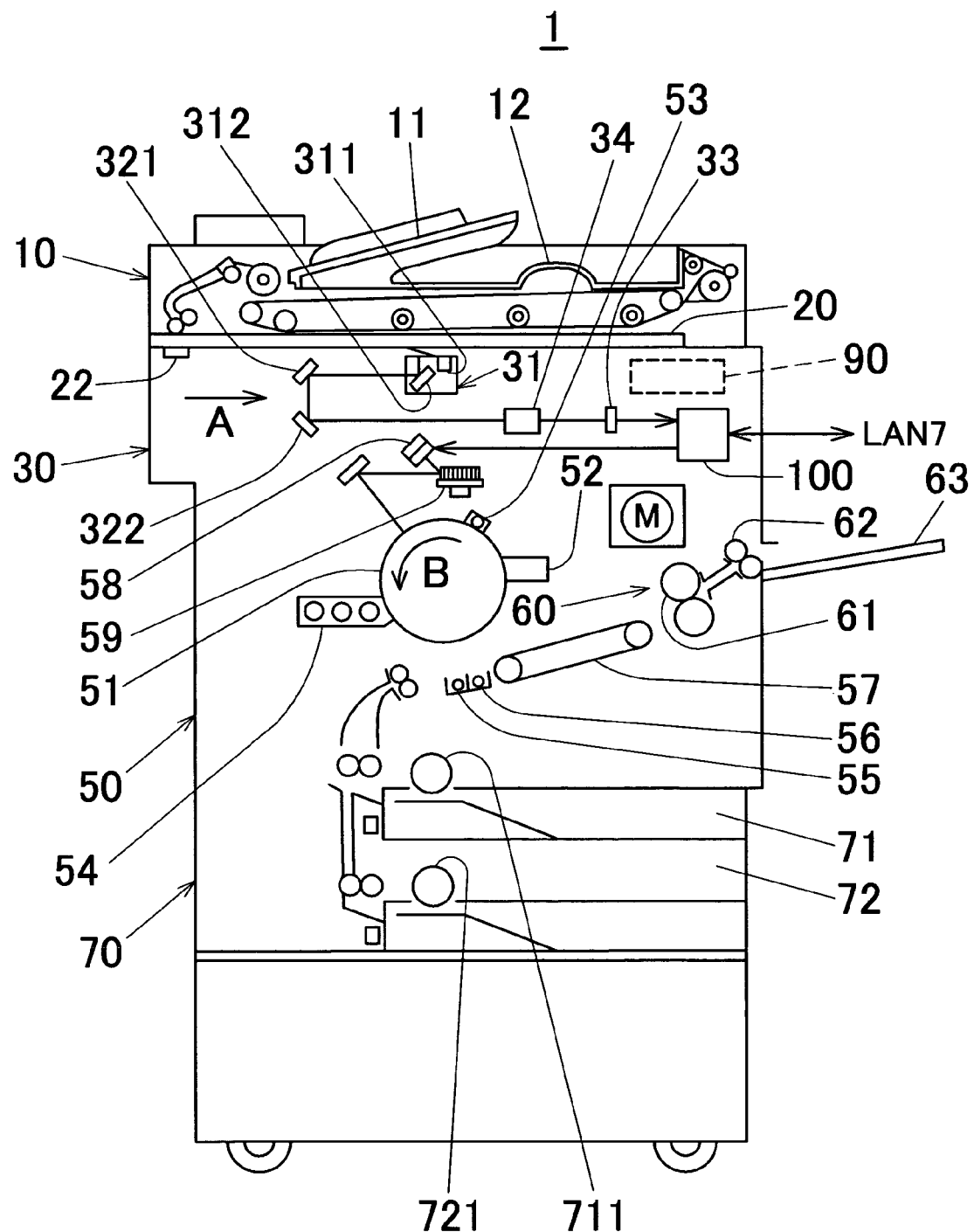
FIG. 2 is a schematic view illustrating the configuration of a multifunctional machine in an embodiment of the present invention.

FIG. 2 is a schematic view illustrating the configuration of a multifunctional machine 1.

As shown in FIG. 2, the multifunctional machine 1 includes an automatic document feeder 10 automatically feeding original sheets one by one separately, and an image reading unit 30 reading image on the original document, an image forming unit 50 forming the image on a sheet, and a sheet feeder 70 providing sheets.

The automatic document feeder 10 includes a document feeding tray 11, a receiving tray 12, and a platen glass 20. In the document feeder 10, original sheets placed on the document feeding tray 11 are automatically fed one by one to the document reading position on the platen glass 20. After image on the original sheet is read out in the image reading unit 30, the original sheet is discharged onto the receiving tray 12.

The image reading unit 30 has a first slider unit 31, sliding below the platen glass 20 in the direction indicated by arrow A in FIG. 2. The first slider unit 31 can read the image on the original sheet by sliding in the vertical scanning direction indicated by arrow A from the extreme left (the scan starting position, which is located just under a shading correction plate 22) for a distance decided by the size of original sheet conveyed to the document reading position. In the image reading unit 30, the light reflected from the original sheet by irradiation of an exposure lamp 311, goes along the optical path directed by a first mirror 312, a second mirror 321, and a third mirror 322 to form an image via a lens 34 on a CCD sensor 33. In the CCD sensor 33, the incident beam is converted to electrical signals, which are then sent to a control unit 100 as image data of the original document.

In the control unit 100, the image data of the original document is then given various image processings such as shading correction, alignment correction, lightness/color space conversion, gamma correction, frame elimination, and color/position editing, and the processed data is stored in an image memory as image data to be used ordinarily. For image formation, the image data is retrieved from the image memory and converted to color tone data. A laser diode 58 is driven according to the color tone data, synchronously with sheet conveyance. The control unit 100 will be described in detail below.

The image forming unit 50 includes a photosensitive drum 51, a laser diode 58, a polygon mirror 59, a static charger 53, a developing unit 54, a transfer charger 55, a separation charger 56, a cleaner 52, etc. A laser beam is emitted from the laser diode 58 according to the driving signal outputted from the control unit 100. The laser beam is deflected and scanned by the polygon mirror 59 rotating at a constant speed, and irradiated on the photosensitive drum 51 rotating in the direction indicated by an arrow B in FIG. 2.

Residual toner on the surface of the photosensitive drum 51 is removed by the cleaner 52 before irradiation, and the surface is electrified uniformly by the static charger 53. An electrostatic latent image is formed on the surface of the photosensitive drum 51, by optical scan of the laser beam. The electrostatic latent image is developed into a toner image with toner supplied by the developing unit 54, and the toner image is transferred by the transfer charger 55 onto a sheet conveyed from the sheet feeder 70.

The sheet carrying the transferred toner image is separated from the photosensitive drum 51 by the separation charger 56 and conveyed by a conveyor belt 57 to a toner fixing unit 60. In the fixing unit 60, the toner image is fixed on the sheet by heat and pressure applied by the toner fixing roller 61. After toner fixing, the sheet is discharged by a discharging roller 62 onto the receiving tray 63.

The sheet feeder 70, which includes sheet cassettes 71 and 72 storing sheets and pickup rollers 711 and 721 feeding the sheets, provides the image forming unit 50 with a specified size of sheets.

Figure 3:
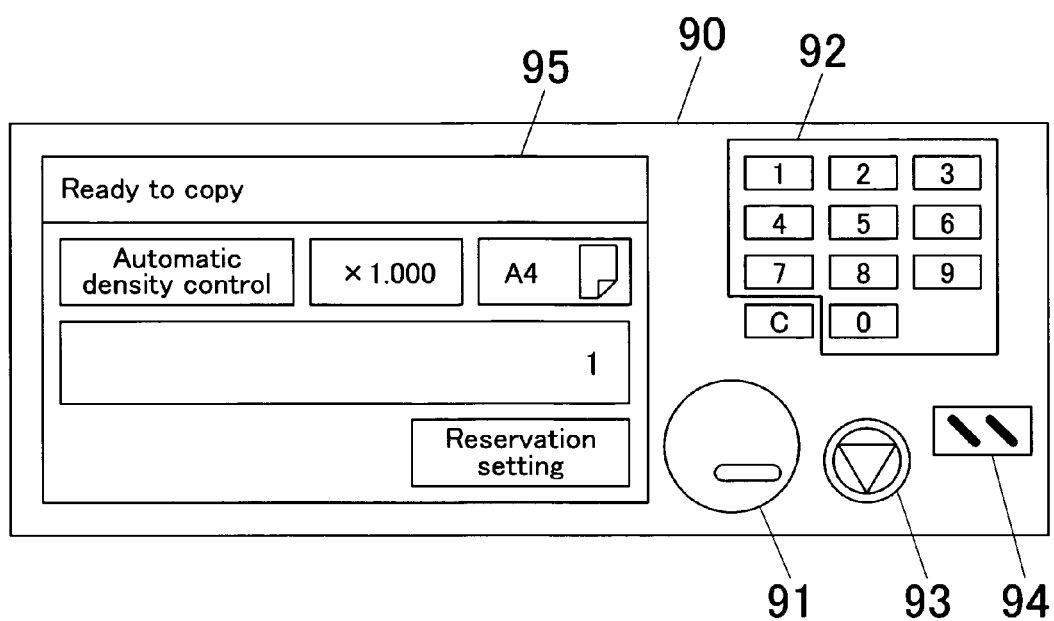
FIG. 3 is an external view of an operation panel.

An operation panel 90 is installed onto the front of the multifunctional machine 1. FIG. 3 is an external view of the operation panel 90.

The operation panel 90 has a start key 91 for giving an instruction to start a job like copy, a numeric key pad 92 to input a value such as number of copies, a clear key 93 to reset the value, the inputted number of copies to zero for example, a stop key 94 to give an instruction to stop an on-going job like copy, and a liquid crystal display unit 95 to set various functions and display messages.

A touch panel is laminated on the surface of the liquid crystal display unit 95 and accepts inputs for copy settings such as color density, copy scale, sheet size, copy mode and copy reservation. It also displays messages showing the number of copies and the state of the multifunctional machine 1. FIG. 3 shows an example of the messages, such as "Ready to copy", "1.000" as a copy scale magnification, "A4" as a sheet size, "1" as a number of copies, and so on.

(3) Configuration of Control Unit 100

Figure 4:
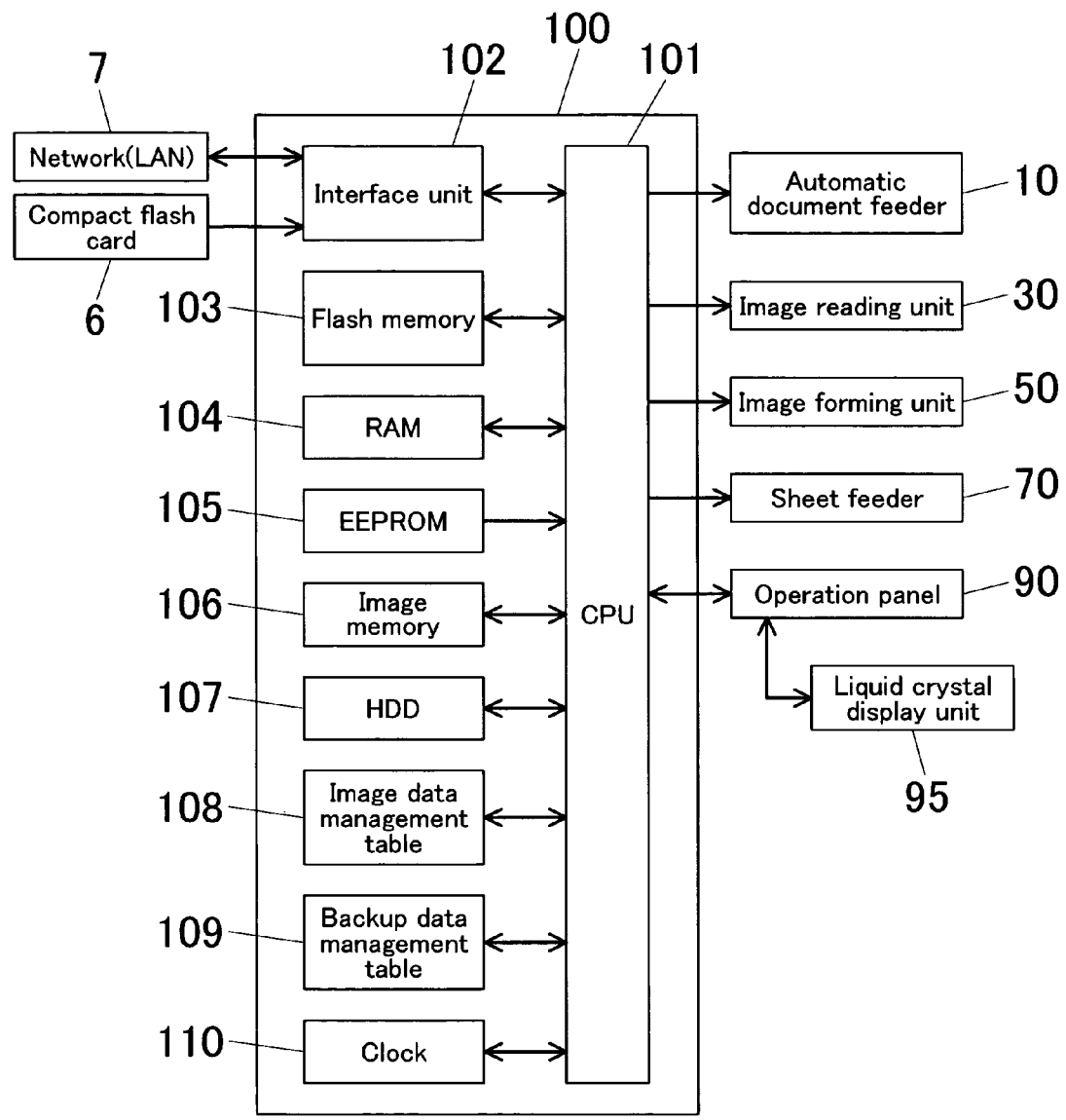
FIG. 4 is a block diagram showing the configuration of a control unit of a multifunctional machine.

FIG. 4 is a block diagram showing the configuration of the control unit 100. The control unit 100 includes a CPU 101, an interface unit 102, a flash memory 103, a RAM 104, an EEPROM 105, an image memory 106, a HDD (hard disk drive) 107, an image data management table 108, a backup data management table 109, and a clock 110.

The interface unit 102 is a physical interface for mutual data transfer among the devices on the network 7, a compact flash memory card 6 and the CPU 101, and functions as a data sending/receiving unit.

The compact flash memory 6 stores firmware, which is composed of programs to control the multifunctional machines 1 and initial values of registered data, and as for the initial values of registered data, it will be described below.

The image memory 106 is a data recording medium consisting of semiconductor memory, which stores image data sent from other multifunctional machines 1 and the PCs 2, and image data read out in the image reading unit 30 and then given image processings accordingly in the image reading unit 30.

The HDD 107 is used as an auxiliary recording medium of the image memory 106. The CPU 101 transfers image data from the image memory 106 to the HDD 107, for purpose of temporal storage if the available memory of the image memory 106 is less than a particular level, and for purpose of permanent storage if there exists in the image memory 106, image data to be stored for a long team.

The EEPROM 105 consistently holds the device code, serial number, and MAC address which are specific to each multifunctional machine 1, regardless whether power is on/off, and the information therein is always readable via the CPU 101. The clock 110 also holds the current time consistently, and the information is also readable anytime via the CPU 101.

The image data management table 108 is to manage specification and hierarchy information of the image data which are written in the HDD 107 for purpose of long-term storage, and it is made of nonvolatile memory.

FIG. 5 includes tables for image data management with its content. As shown in FIG. 5, the image data management table 108 is composed of a hierarchy management table 108*a* to manage boxes, and a data specification management table 108*b* to manage the specification of image data.

As shown in FIG. 5, the hierarchy management table 108a contains columns such as box number and box name. Boxes represent recording space for storing various image data, which are classified respectively in an appropriate box so that an individual user can find target data promptly. Each box can store multiple image data.

Sequence numbers for box identification are given in advance in the box number column of the hierarchy management table 108a, while the maximum value of box number is determined in advance. Box names go in the box name column. As shown in FIG. 5, there are columns of reference number, image data name, date, time, data size, ID number and box number, in the specification management table 108b. When image data is accepted, information about the image data is added as one record to the end of the specification management table 108b. On the other hand, when image data is deleted, the corresponding record is also deleted from the table.

When image data is accepted, a reference number is provided in the reference number column of the specification management table 108b. In the present embodiment, sequence numbers are given in the accepting order. For each image data, user's specified name or a unique number automatically generated by the CPU101 based on the data for example, is written in the image data name column.

The date of accepting image data is written in the date column. The time of accepting data is written in the time column. The date and time used here is read out from the clock 110.

The finally determined data size of the image data after various image processings is written in the data size column. An ID number for identifying the image data is written in the ID number column. The ID number is given to identify every image data including even those which are not stored in the HDD 107.

The box number in the hierarchy management table 108a which corresponds to the box including the target image data, is written in the box number column. When a user specified a particular box name, the corresponding number is written, and when no box name is specified, a box number prepared in advance is written therein.

Figures 6, 7:
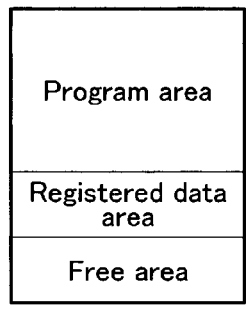
FIG. 6 is a view showing a backup data management table with its content.
FIG. 7 is a view showing the memory map of a flash memory.

The back up data management table 109 is a table for managing the information about an originating machine (hereinafter, an originating machine will be referred to also as a sender) of the back up data (hereinafter, the back up data will be referred to also as the evacuated data) accepted in the back up multifunctional machine 1 for evacuation. FIG. 6 shows a backup data management table 109 with its content.

As shown in FIG. 6, the backup data management table 109 has columns of reference number, sender address, device code, serial number, old ID number and ID number. The backup data management table 109 also has a function to show the history of data evacuation, and when data is accepted for evacuation, the information about the evacuated data is added to the end of the table as one record. On the other hand, after completion of data evacuation, the corresponding record is removed from the table.

When data is accepted for evacuation, a reference number is provided in the reference number column of the backup data management table 109 to identify each data. Sequence numbers are given in the accepting order in this column in the present embodiment.

An IP address, representing a location on the network of the sender multifunctional machine 1 of the evacuated data, is written in the sender address column. The device code of the sender multifunctional machine 1 of the evacuated data is written in the device code column. The serial number of the sender multifunctional machine 1 of the evacuated data is written in the serial number column. The sender multifunctional machine 1 is identified by verification of its IP address, device code, and serial number.

The ID number of image data in the sender multifunctional machine 1 is written in the old ID number column. An ID number of the stored image data in the backup multifunctional mahine1 is written in the ID number column. The ID number is provided in advance to identify each image data.

The flash memory 103 consists of nonvolatile memory which is re-writable in blocks, and stores various programs needed for operation of the multifunctional machine 1 and registered data inputted by a user.

FIG. 7 is a view showing the memory map of a flash memory 103. As shown in FIG. 7, there placed a program area in the lower address area, a registered data area in the upper address area and a free area in the still upper address area. The free area is an auxiliary just for use in expanding the number of stored registered data, and not used ordinarily.

The RAM 104 consists of volatile memory, to be used as a work area for CPU101 to execute a program.

Here are some practical examples of registered data that a user can input: mail addresses in a mail address table, network addresses in a network address table and digits (fax numbers) in a digits table. A mail address is used when an e-mail is transmitted with attached image data. A network address is used when image data is transmitted directly according to a protocol, such as FTP. A fax number is used when image data is transmitted by fax.

FIG. 8 is a view showing a mail address table with its content. As shown in FIG. 8, the mail address table 111 has columns of reference number, destination, and mail address. The mail address table 111 also has a function to show the latest list of existing registered mail addresses, and when a mail address is accepted for registration, information about the mail address is added as one record to the end of the table. On the other hand, when there is an instruction to delete a mail address, the corresponding record is deleted from the table.

When a mail address is accepted for registration, a sequence number for identification of the mail address is added in the reference number column of the mail address table 111, while the maximum value of reference number is determined in advance, and addition of record is prohibited if the sequence number is larger than the determined maximum value. User's inputted destination is written in the designation column for each mail address. Similarly, user's inputted mail address is written in the mail address column.

FIG. 9 is a view showing a network address table 112 with its content. Detailed explanation about the content would be similar as those in the mail address table 111.

FIG. 10 is a view showing a digits table 113 with its content. Detailed explanation about the content would be similar as those in the mail address table 111. The digits table 113 is not used here since no fax is connected in the present embodiment.

The CPU 101 reads out an appropriate program from the flash memory 103, controls the operational timing of each unit uniformly, and enables smooth operation of copying, printing, etc. Each program is executed periodically at a predetermined interval.

In addition, the CPU 101 judges whether the compact flash card 6 is connected, and if connected, reads out a program or others and writes it in the flash memory 103.

When image data is sent from the image memory 106 to the HDD 107 for long-term storage, the CPU 101 writes a reference number, image data name, date, time, data size, ID number, and box number in the data specification management table 108b from the image data management tables 108. And image data is accepted for registration, the CPU 101 fills out the columns of reference number, sender address, device code, serial number, old ID number, and ID number in the backup management table 109.

The multifunctional machine 1 has two operation modes: the normal operational mode in which all functions are available, and the sleep mode in which power consumption can be saved while major part of the functions is not available. In the sleep mode, power supply to the image memory 106 and others is disconnected.

When a predetermined time elapsed after completion of copying, printing, etc., the CPU 101 shifts its mode from normal operation mode to sleep mode, and when image data is received via the network 7 or a user inputs something from the operation panel 90, the CPU 101 returns from sleep mode to normal operation mode.

(4) Control Procedure of Control Unit 100

Hereinafter, control procedure of the control unit 100 will be described.

Figure 11:
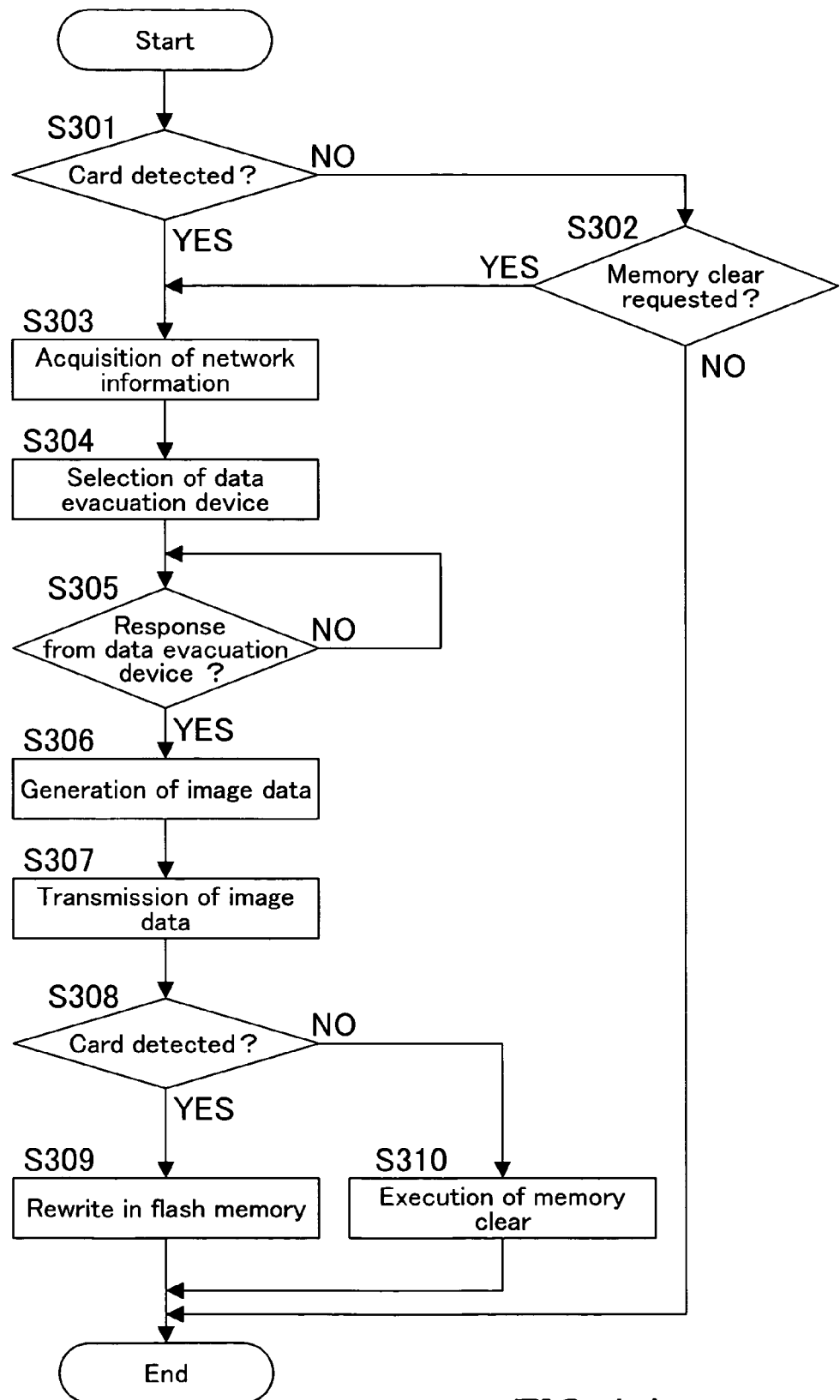
FIG. 11 is a flow chart showing the procedure of sending backup data, such as registered data, from a multifunctional machine to another multifunctional machine.

FIG. 11 is a flow chart showing the procedure of sending backup data, such as registered data, from a multifunctional machine 1 to a backup multifunctional machine 1 (hereinafter, a backup machine will be referred to also as an evacuation machine). The procedure is executed by the CPU 101 according to a program read out from the flash memory 103.

As shown in FIG. 11, the CPU 101 in the control unit 100 determines whether the compact flash card 6 is inserted (step S301). The judgment is made by examining the level of insertion detection signal. If the CPU 101 determines the card is not inserted ("No" in step S301), the CPU 101 then determines any memory clear request (step S302). The judgment is made by the state of the flag that is defined as the variable in the RAM 104.

If the CPU 101 determines that there is no memory clear request ("No" in step S302), the CPU 101 then judges that there is no need for backup operation of registered data and others; the process is terminated and goes back to the main routine. On the other hand, if the CPU 101 judges that the compact flash card 6 is inserted ("Yes" in step S301) or that there is any memory clear request ("Yes" in step S302), the CPU101 obtains the IP address data base from another multifunctional machine 1 that is connected via the network 7 (step S303). The data base is prepared in advance by obtaining information directly from a server on the network or from another multifunctional machine 1 connected to the subnetwork 4a or 4b using the IP address and the subnet mask of the sender multifunctional machine 1.

In step S304, a multifunctional machine is selected as an evacuation machine among multifunctional machines 1 listed and ready to send data in the data base. And the corresponding IP address is also selected at the same time.

In step S305, data is communicated via the network 7 to determine whether or not the evacuation multifunctional machine 1 is ready to receive the backup data. The judgment is made by examining whether or not the evacuation multifunctional machine 1 can return a response according to a predetermined protocol. If it is judged that the machine is not ready to receive the backup data ("No" in step S305), the system waits until it becomes ready. If it is judged that the machine is ready ("Yes" in step S305), image data are generated from the registered data and others (step S306).

The procedure of reproducing monochromatic binary image data from registered data and will be described, taking the mail address table 111 as an example.

As for monochromatic binary image data, the main scanning line 1 corresponds to the attribute title row of the table, and the main scanning line 2 and its following lines correspond respectively to each of the record rows of the table.

The forefront line stores a character string: "mail address table" and the total number of records in the table, a character string: "reference number" and the fixed number of characters in the column, a character string: "destination" and the fixed number of the characters in the column, and a character string: "mail address" and the fixed number of the characters in the column. Each of the line 2 and its following lines stores data as a character string with a fixed length defined in the forefront line for each column. If the character string to be stored is shorter than the defined fixed length, it is converted to the fixed length by plugging the gap with spaces. In addition, if the lengths of character strings are different between the forefront line and the line 2 and its following lines, the lengths are adjusted also by plugging the gap with spaces.

Finally, the character strings in each line are converted to monochromatic binary image data according to the ASCII code system. Entire monochromatic image data is generated in the image memory 106, and an image data specification table 114 that relates to the image data is also generated temporarily in the RAM 104.

The image data specification table 114 is a table to store the specification information of monochromatic binary image data including the registered data and so on. The makeup of table is same as that for image data temporarily generated in copying or printing process.

Figures 12, 13:
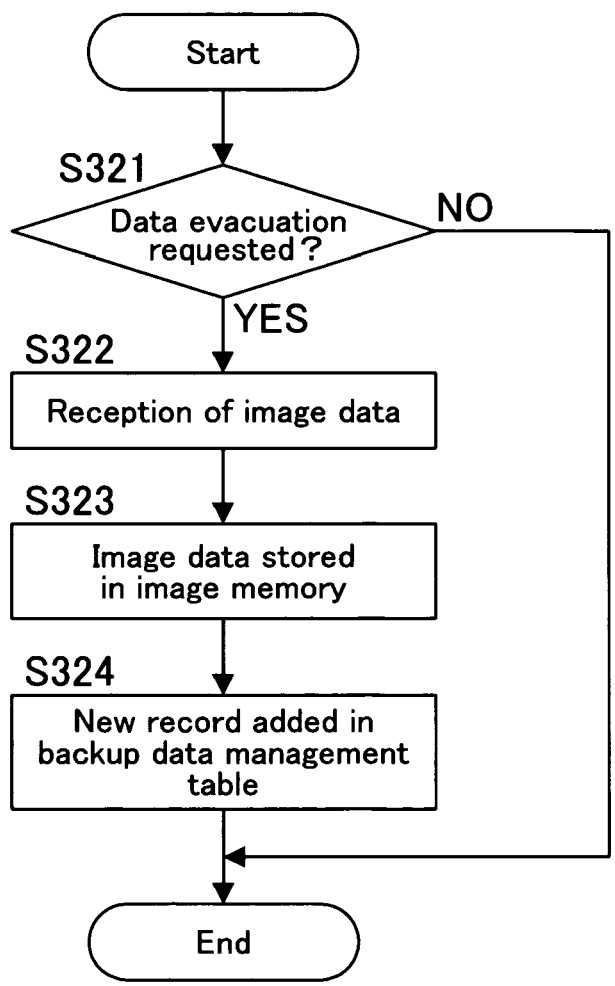
FIG. 12 is view showing an image data specification table with its content.
FIG. 13 is a flow chart showing the procedure for a back up multifunctional machine to receive backup data from an originating multifunctional machine.

FIG. 12 a view showing an image data specification table 114 with its content. As shown in FIG. 12, the image data specification table 114 has columns of data size, format, and ID number. The pixel count of image data in the main scanning direction and the pixel count of image data in the vertical scanning direction are written in the data size column. The bit count per pixel and the number of planes per pixel are written in the format column. Generally, bit count is 8 for color image and 1 for monochromatic image. Number of planes is 1 for monochromatic image, 3 for RGB color image and 4 for YMCK color image. An ID number for each image data is written in the ID number column. The ID number is provided in advance to identify each image data.

In the similar procedure as above, the content in the image data management table 108 can be converted into monochromatic binary image data.

Back to FIG. 11, in step S307, the device code and the production serial number read out from the EEPROM 105 are transmitted; the content in the image data specification table 114 read out from the RAM 104 is transmitted; and the monochromatic binary image data read out from the image memory 106 is transmitted. The operations are repeated until all image data generated in step S306 are completely transmitted. Then, the image data that are registered in the image data management table 108 and specified for backup, are also transmitted.

The CPU 101 once again determines whether or not the compact flash card 6 is inserted in step S308. If insertion of the compact flash card 6 is recognized ("YES" in step S308), the CPU 101 reads out the firmware including a program and registered data with initial values from the compact flash card 6, and rewrites the content in the flash memory 103 (step S309). The subroutine is then terminated and the process returns to the main routine.

The registered data area of the flash memory 103 will not be rewritten, if the firmware contains only a program area, i.e. if the block number of the flash memory 103 is not going to be changed by rewriting.

If insertion of the compact flash card 6 is not recognized ("No" in step S308), system setting values stored in the HDD 107 besides image data, and the content in the image data management table 108, are rewritten with initial values (step S310). The procedure is then terminated and the process returns to the main routine.

After firmware update or memory clear, the multifunctional machine 1 should be restarted for initialization by power ON/OFF. If the IP address and the subnet mask of the multifunctional machine 1 are rewritten with initial values after restart, it is necessary to input appropriate values once again. However, if the network settings are acquired automatically by DHCP, the IP address and the subnet mask are set automatically.

FIG. 13 is a flow chart showing the procedure for an evacuation destination multifunctional machine 1, i.e., a data backup device, to receive the evacuated data such as registered data from a sender multifunctional machine 1. The procedure is executed by the CPU 101 according to a program read out from the flash memory 103.

As shown in FIG. 13, the CPU 101 in the control unit 100 first judges whether or not there is any request for data evacuation such as registered data from another multifunctional machine 1 (step S321). The judgment is made based on the data sent to the interface unit 102 via the network 7.

If there is no request for data evacuation ("No" in step S321), the procedure is terminated and the process returns to the main routine. If there is any request ("Yes" in step S321), the IP address of the sender multifunctional machine 1 is obtained from a communication protocol; then, the device code and the serial number of the sender multifunctional machine 1 are received; and finally, both of image data and its specification information are received (step S322). The image data contains not only registered data and others, but also normal image data itself to be backuped.

In step S323, the image data is stored as evacuated data in the image memory 106, based on the received image data and its specification information. At the same time, a unique ID number is given to the image data.

In step S324, a new record is added to the backup data management table 109; the IP address, device code, and serial number of the sender multifunctional machine 1 are written respectively into the appropriate column: sender address, device code or serial number in the table; the ID number in the sender multifunctional machine 1 for each evacuated data is written in the old ID number column; and the ID number provided in step S323 is written in the ID number column. The reference number is issued automatically when a new record is added. After completion of writing in the table, the procedure is terminated and the process returns to the main routine.

Figure 14:
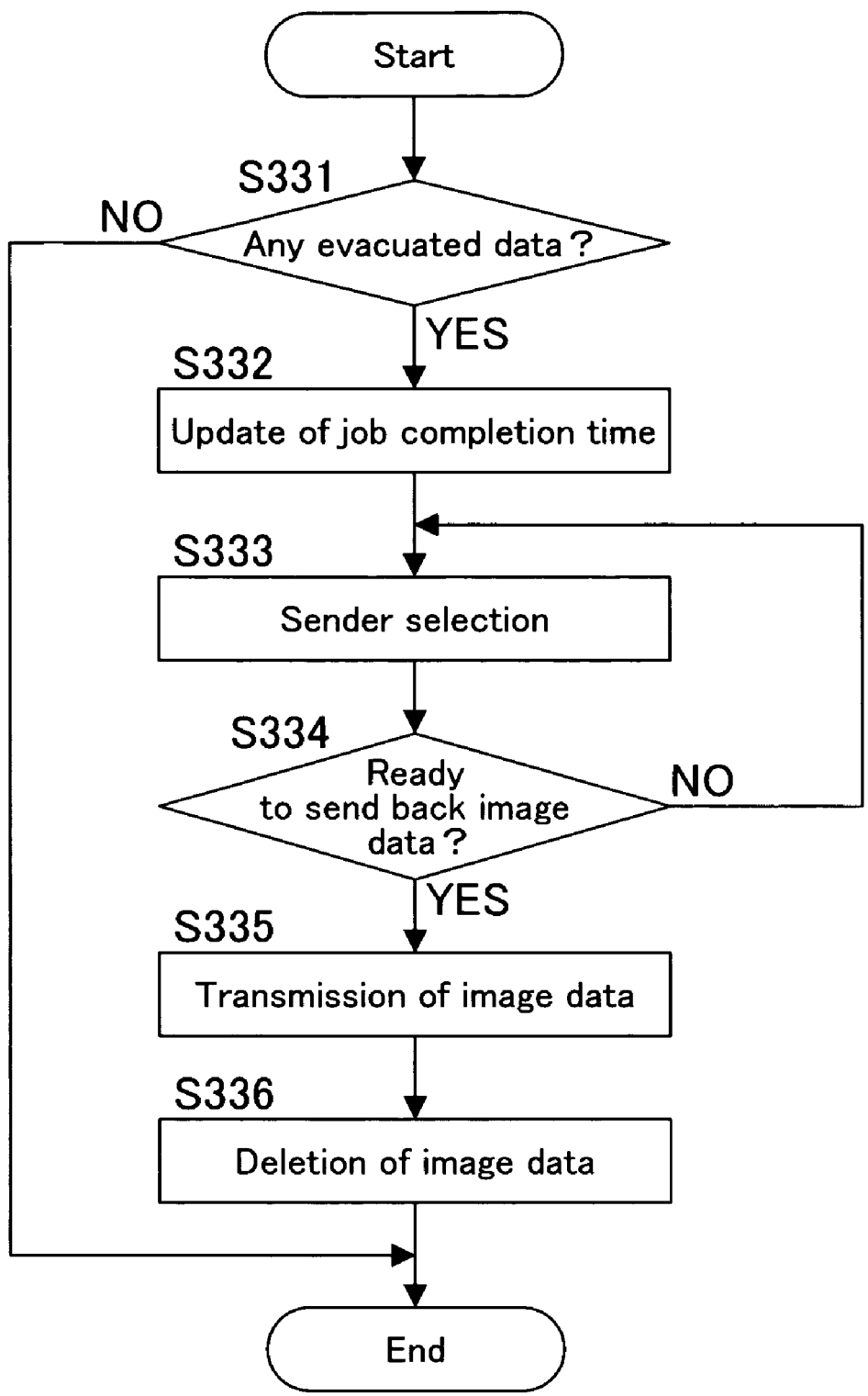
FIG. 14 is a flow chart showing an example of the procedure for a back up multifunctional machine to send back backup data to an originating multifunctional machine.

FIG. 14 is a flow chart showing an example of the procedure for a data backup device i.e. an evacuation multifunctional machine 1, to send back evacuated data such as registered data to an originating multifunctional machine 1. The procedure is also executed by the CPU 101 according to a program read out from the flash memory 103.

As shown in FIG. 14, the control unit 100 judges whether or not there is any evacuated data in the image memory 106 (step S331). The judgment is made based on the presence of record in the backup data management table 109. If there is no evacuated data ("No" in step S331), the procedure is terminated and the process returns to the main routine. If there is any evacuated data ("Yes" in step S331), the termination time of all copying or printing operations (job completion time) is rewritten with the current time read out from the clock 110 (step S332).

The job completion time is stored in the RAM 104 and updated as needed, and used as a standard to shift the operational mode of the multifunctional machine 1 from normal to sleep mode. Meanwhile the evacuated data may get missing in the sleep mode where power supply to the image memory 106 is disconnected. To obviate the mess, the job completion time is rewritten with the current time read out from the clock 110 and thus the operational mode is controlled so as not to switch to sleep mode. In this way, it is possible to obviate the evacuated data missing.

In step S333, data is communicated via the network 7 to an IP address in the sender address column, for each record in the ascending order of the reference numbers in the backup data management table 109, and if there is a response from an IP address, that record of sender multifunctional machine 1 is selected.

If automated retrieval is selected in advance, next record is selected in the ascending order of the reference numbers in the backup data management table 109, every time when the present step is called. Candidate IP addresses in the subnet 4*a* or 4*b* is automatically generated based on the IP address and the subnet mask set in advance for the multifunctional machine 1, and data is communicated to the IP addresses in the subnet.

The IP address in the sender address column is temporarily replaced with the IP address that practically returned a response. The IP address is characterized by same logical AND as the subnet mask described above.

In step S334, it is judged whether or not the device code and the serial number of the connected sender multifunctional machine 1 are identical with the device code and the serial number in the backup data management table 109, and also, whether or not the connected sender multifunctional machine 1 is ready to receive the image data (i.e., evacuation multifunctional machine 1 is ready to send image data). If it is not ready to send image data ("No" in step S334), the process goes back to step S333, to select another sender multifunctional machine 1 once again. If it is ready to send image data ("Yes" in step S334), the image data corresponding to the ID number in the backup data management table 109 is read out from the image memory 106, and sent together with the old ID number (step S335). Then, this record is removed from the backup data management table 109.

In step S336, the image data corresponding to the ID number is removed from the image memory 106, and the procedure is terminated and the process returns to the main routine.

As described above in the present embodiment, an evacuation multifunctional machine 1 accesses an originating multifunctional machine 1 to examine whether or not it is ready to accept evacuated data, then automatically sends back the data to the originating multifunctional machine 1 when it becomes ready to receive the data. Thus, even if registered information in an originating multifunctional machine 1 gets missing by initialization due to restart after firmware update or memory clear, it is sure that the evacuated data can be sent back to the originating multifunctional machine 1.

In addition, because the evacuated data is removed from the image memory 106 after the data is sent back, it is also possible to prevent the decrease in the capacity of image memory 106 due to the presence of the evacuated data not needed any more.

Figure 15:
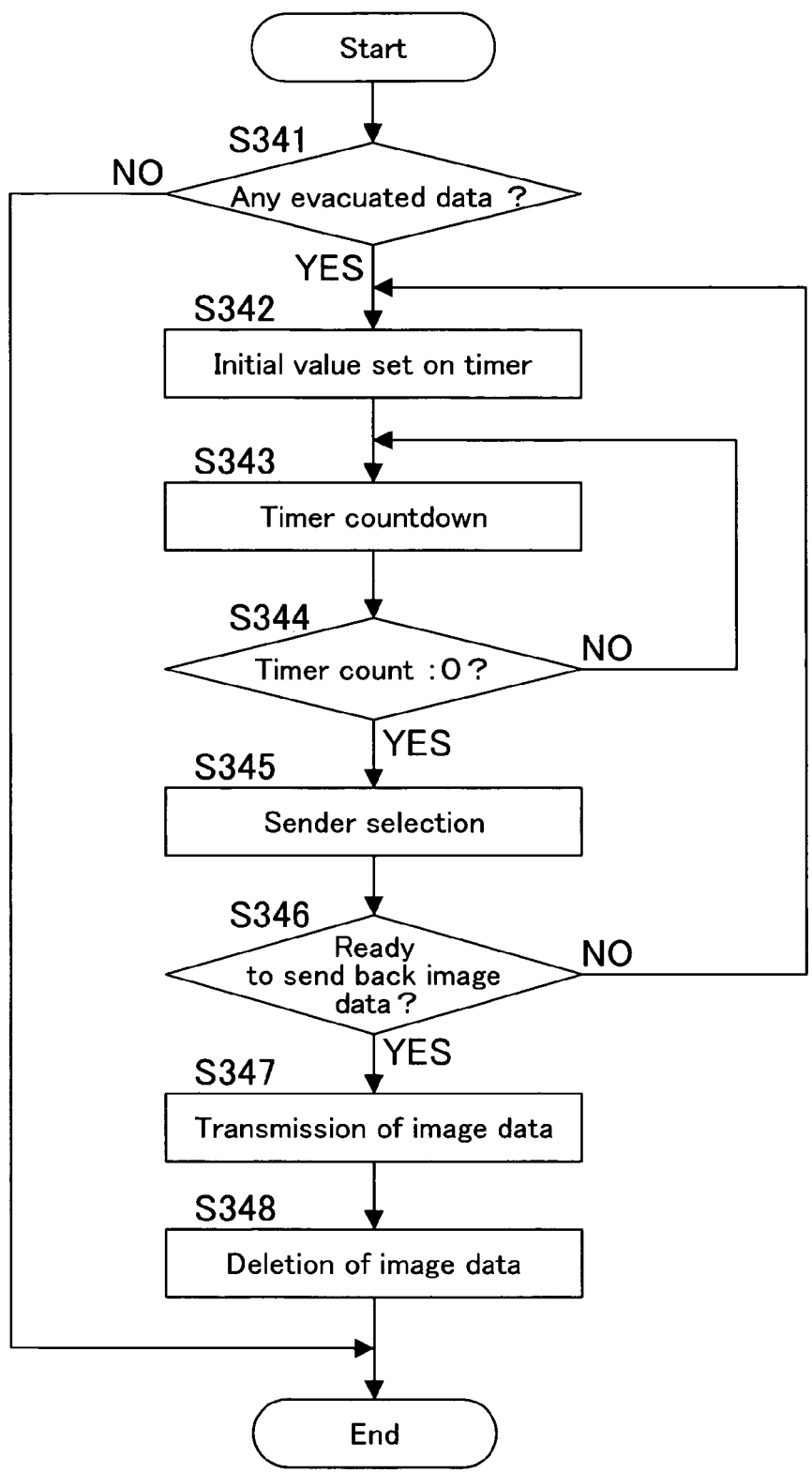
FIG. 15 is a flow chart showing another example of the procedure for a backup multifunctional machine to sent back backup data to an originating multifunctional machine.

FIG. 15 is a flow chart showing another example of the procedure for an evacuation multifunctional machine 1 to send back evacuated data such as registered data to an originating multifunctional machine 1. This procedure is also executed by the CPU 101 according to a program read out from the flash memory 103.

As shown in FIG. 15, the control unit 100 judges whether or not there is any evacuated data in the image memory 106

(step S341). The judgment is made based on the presence of record in the backup data management table 109.

If there is no evacuated data ("No" in step S341), the procedure is terminated and the process returns to the main routine. If there is any evacuated data ("Yes" in step S341), an initial value is set on the timer in the RAM 104 (step S342). The initial value may be a constant or a variable decreasing one by one every time this step is called. The sender multifunctional machine 1 should be restarted after firmware update by power ON/OFF, and thus, cannot respond to data communication via the network 7 for some time during restart. Therefore, initial value to be set on the timer is determined taking into consideration sender's not available time period.

In step S343, the timer counts down only by one.

In step S344, it is judged whether or not the timer count is 0. If it is not 0 ("No" in step S344), this indicates the standby time is not over, and the process goes back to step S343. If it is 0 ("Yes" in step S344), this indicates the standby time is over, and the process proceeds to the next step S345.

Since steps S345 to S348 are similar to steps S333 to S336 in FIG. 14, and description thereof is omitted.

Also in the present embodiment, similarly to the example shown in FIG. 14, since evacuated data is automatically sent back from an evacuation multifunctional machine 1 to an originating multifunctional machine 1; even if the registered information in the originating multifunctional machine 1 gets missing by initialization due to restart after firmware update or memory clear, it is sure that the evacuated data can be sent back to the originating multifunctional machine 1.

In addition, since the operating state of the sender multifunctional machine, whether or not it is ready to receive data, is confirmed at a predetermined interval set on the timer, it is possible to decrease the processing loads on the network 7 and the evacuation multifunctional machine 1, compared to the case where the confirmation is conducted consistently. What more, if the initial value is set on the timer in step S342 is variable decreasing one by one every time the step is called, the time interval of the confirmation, whether or not the sender multifunctional machine 1 is ready to receive data, comes to be shorter, and thus, it is possible to complete sending back the evacuated data earlier.

Figure 16:
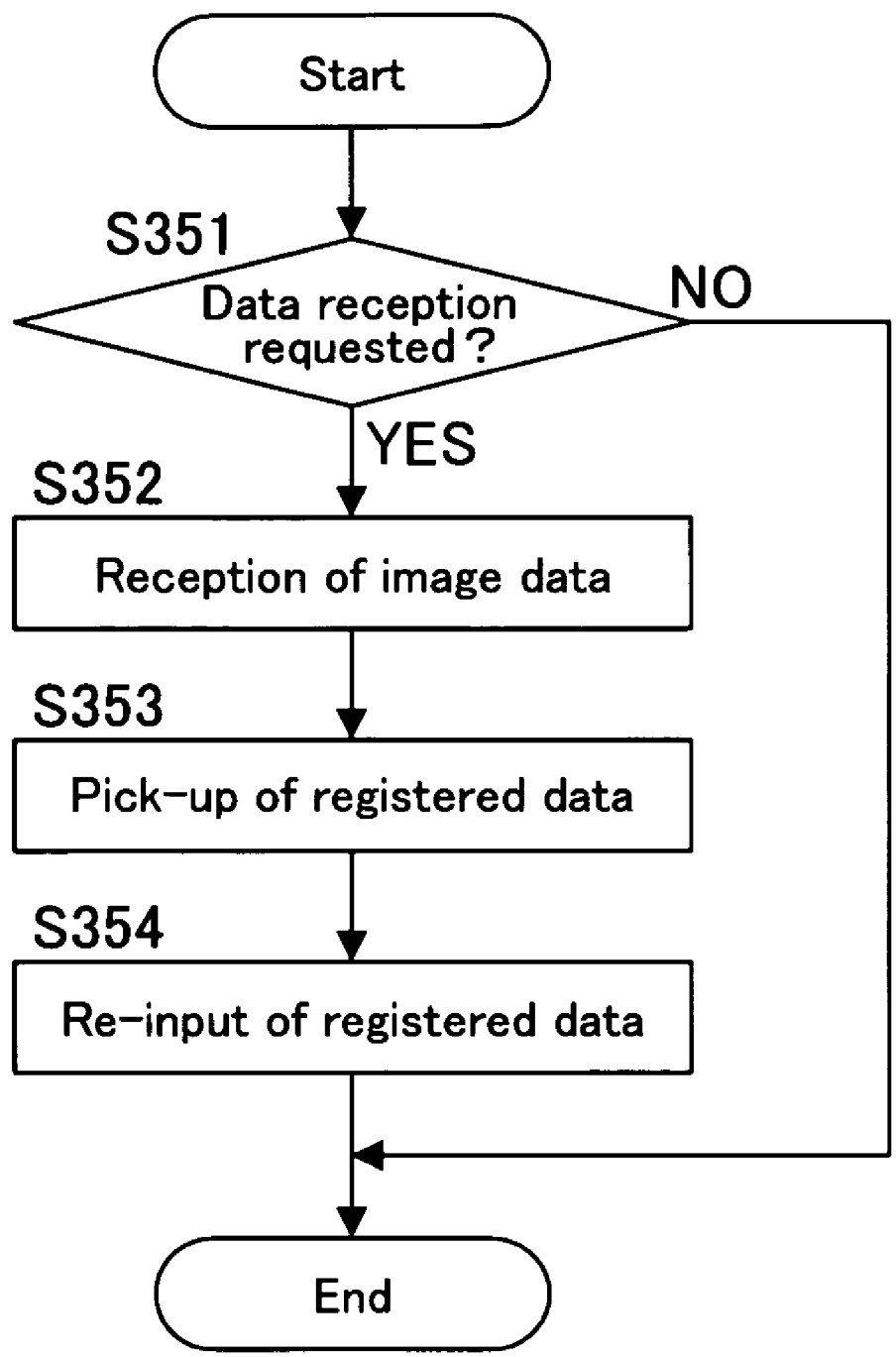
FIG. 16 is a flow chart showing the procedure for an originating multifunctional machine to receive backup data from a backup multifunctional machine.

FIG. 16 is a flow chart showing the procedure for an originating multifunctional machine 1 to receive evacuated data from an evacuation multifunctional machine 1.

As shown in FIG. 16, the CPU 101 in the control unit 100 first judges whether or not there is any request for reception of backup data such as registered data from the backup multifunctional machine 1 (step S351). The judgment is made based on the data sent via the network 7 into the interface unit 102. If there is no request ("No" in step S351), the procedure is terminated and the process returns to the main routine. If there is any request ("Yes" in step S351), the image data is received (step S352). The image data not only contains registered data and others, but also normal image data that was backuped.

In step S353, the registered data and the image data management table with its content are picked up from the received image data. The backuped image data is stored in the HDD 107 together with the received old ID number that will be reused as ID number for the image data.

In step S354, the received registered data and the image data management table with its content are re-inputted by the CPU 101 respectively into the flash memory 103 and the image data management table 108 for restoration. After completion of re-inputting, the procedure is terminated and the process returns to the main routine.

Favorable embodiments of the present invention are described so far, but the present invention is not limited to the embodiments. Above for example, data is sent from an image forming apparatus to another image forming apparatus, i.e. a data backup device, for data evacuation in the embodiment above, but the data may be sent from an image forming apparatus to a PC2 for example.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrate herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "not well."

What is claimed is:

1. A data backup device, comprising:
   a receiver unit receiving from an image forming apparatus via a network backup data and sender information indicating a network address of the image forming apparatus and a device identification that specifically identifies the image forming apparatus, the backup data being sent when an operation updating firmware of the image forming apparatus is executed;
   a memory unit storing the backup data and the sender information that are received, the received sender information being stored in the memory unit at least until the backup data is sent back to the image forming apparatus;

an identifying unit identifying the image forming apparatus by comparing a network address of the image forming apparatus and a device identification that specifically identifies the image forming apparatus with the network address and the device identification in the sender information;

a judgment unit, automatically without a request for retrieving the backup data from the image forming apparatus, judging whether or not the identified image forming apparatus is ready to receive the backup data; and a transmitting unit sending the backup data back to the identified image forming apparatus corresponding to the sender information stored in the memory unit, when the judgment unit judges that the image forming apparatus is ready to receive the backup data.

2. The data backup device as recited in claim 1, further comprising an eraser unit erasing the backup data stored in the memory unit after the transmitting unit sends back the backup data.

3. The data backup device as recited in claim 1, further comprising a control unit, which controls an operational mode so as not to fall into a sleep mode, in which a power supply to the memory unit is disconnected, when the backup data is stored in the memory unit.

4. The data backup device as recited in claim 1, comprising an image forming apparatus.

5. The data backup device as recited in claim 1, further comprising:

an operating state acquiring unit acquiring based on the sender information, the operating state of the image forming apparatus, whether or not it is ready to receive the backup data, and wherein:

the judgment unit judges based on the acquired operating state, whether or not the image forming apparatus is ready to receive the backup data.

6. The data backup device as recited in claim 5, wherein:

the operating state acquiring unit acquires the operating state of the image forming apparatus at a predetermined interval.

7. The data backup device as recited in claim 6, wherein the time interval becomes shorter as time advances.

8. A data backup system including an image forming apparatus and a data backup device backing up the data in the image forming apparatus, and those are interconnected via a network, the image forming apparatus, comprising:

a first memory unit storing firmware and registered data inputted by a user;

a first judgment unit judging whether or not an operation updating the firmware of the image forming apparatus is executed;

a first transmitting unit transmitting the registered data and sender information to the data backup device when the first judging unit judges the operation corresponding to updating the firmware is executed; the sender information indicating the location of the image forming apparatus on the network;

a first receiver unit receiving backup data from the data backup device via the network; and a control unit making the first memory unit store backup data received by the first receiver unit;

the data backup device, comprising:

a second receiver unit receiving from the image forming apparatus via the network, the registered data and the sender information;

a second memory unit storing the received registered data as the backup data and storing the received sender information; the sender information being stored in the second memory unit at least until the backup data is sent back to the image forming apparatus;

a second judgment unit, automatically without a request for retrieving the backup data from the image forming apparatus, judging whether or not the image forming apparatus is ready to receive the backup data;

a second transmitting unit sending the backup data back to the image forming apparatus corresponding to the sender information stored in the second memory unit, when the second judgment unit judges that the image forming apparatus is ready to receive the backup data;

wherein the image forming apparatus is identified based on a comparison of a network address of the image forming apparatus and a device identification that specifically identifies the image forming apparatus with the network address and the device identification in the sender information.

9. The backup system as recited in claim 8, the data backup device further comprising:

an operating state acquiring unit acquiring based on the sender information, the operating state of the image forming apparatus, whether or not it is ready to receive the backup data, and wherein:

the judgment unit judges based on the acquired operating state, whether or not the image forming apparatus is ready to receive the backup data.

10. The data backup system as recited in claim 9, wherein:

the operating state acquiring unit acquires the operating state of the image forming apparatus at a predetermined interval.

11. A non-transitory computer readable medium storing a data backup program which makes a computer execute a process comprising the steps of:

receiving from an image forming apparatus via a network, backup data and sender information indicating a network address of the image forming apparatus and a device identification that specifically identifies the image forming apparatus, the backup data being sent when an operation updating firmware of the image forming apparatus is executed;

storing in a memory unit, the backup data and the sender information that are received; the sender information being stored in the memory unit at least until the backup data is sent back to the image forming apparatus;

identifying the image forming apparatus by comparing a network address of the image forming apparatus and a device identification that specifically identifies the image forming apparatus with the network address and the device identification in the sender information;

judging, automatically without a request for retrieving the backup data from the identified image forming apparatus, whether or not the identified image forming apparatus is ready to receive the backup data; and sending the backup data back to the image forming apparatus corresponding to the sender information stored in the memory unit, when the identified image forming apparatus is judged to be ready to receive the backup data in the prior step.

12. The non-transitory computer readable medium as recited in claim 11, wherein the processing further comprising a step of erasing the backup data stored in the memory unit, after the backup data is sent back.

13. The non-transitory computer readable medium as recited in claim 11, wherein the processing further comprising a step of controlling an operational mode of the image forming apparatus so as not to fall into a sleep mode, in which a power supply to the memory unit is disconnected, when the backup data is stored in the memory unit.

14. The non-transitory computer readable medium as recited in claim 11, further comprising:
   acquiring based on the sender information, the operating state of the image forming apparatus, whether or not it is ready to receive the backup data, and wherein:
   it is judged based on the acquired operating state, whether or not the image forming apparatus is ready to receive the backup data.

15. The non-transitory computer readable medium as recited in claim 14, wherein:
   the operating state of the image forming apparatus us is acquired at a predetermined interval.

16. The non-transitory computer readable medium as recited in claim 15, wherein the time interval becomes shorter as time advances.

* * * * *